United States Patent
Cunningham et al.

(10) Patent No.: US 8,169,104 B2
(45) Date of Patent: May 1, 2012

(54) CONTROL SYSTEM FOR A BATTERY POWERED VEHICLE

(75) Inventors: Iain Douglas Cunningham, Coventry (GB); Chris Sheehan, Coventry (GB)

(73) Assignee: International Truck Intellectual Property Company, LLC, Lisle, IL (US)

( * ) Notice: Subject to any disclaimer, the term of this patent is extended or adjusted under 35 U.S.C. 154(b) by 165 days.

(21) Appl. No.: 12/602,796

(22) PCT Filed: Jun. 26, 2008

(86) PCT No.: PCT/GB2008/002191
§ 371 (c)(1),
(2), (4) Date: Mar. 1, 2010

(87) PCT Pub. No.: WO2009/001086
PCT Pub. Date: Dec. 31, 2008

(65) Prior Publication Data
US 2010/0181827 A1    Jul. 22, 2010

(30) Foreign Application Priority Data
Jun. 27, 2007   (GB) .................................. 0712394.6

(51) Int. Cl.
*B60L 1/00* (2006.01)
*B60L 3/00* (2006.01)
*H02G 3/00* (2006.01)

(52) U.S. Cl. ..................... 307/9.1; 307/10.1; 307/10.2

(58) Field of Classification Search ............ 307/9.1, 307/10.1, 10.2; 340/426.11
See application file for complete search history.

(56) References Cited

U.S. PATENT DOCUMENTS

| 4,739,184 A | 4/1988 | Onesti |
| 4,799,126 A | 1/1989 | Kruse |

(Continued)

FOREIGN PATENT DOCUMENTS

GB    2395331    *   5/2004

OTHER PUBLICATIONS

PCT Search Report from priority application, PCT/GB2008/002191, dated Dec. 31, 2008.

*Primary Examiner* — Jared Fureman
*Assistant Examiner* — Carlos Amaya
(74) *Attorney, Agent, or Firm* — Jeffrey P. Calfa; Mark C. Bach; Gerald W. Askew (57) ABSTRACT

A control system for a battery powered vehicle of the kind which is provided with an electric power source and at least one switch means, such as a contactor, which is operable to connect the output of the power source to a high power electrical item fitted to the vehicle, such as an electric drive motor, in which the control system is operable to set the vehicle in one of at least 3 different operating modes comprising a first mode in which the vehicle is immobilized and the contactor is held in an open position to isolate the battery from the electrical item, a second mode in which the vehicle is not immobilized and the contactor is held in a closed position to connect the battery to the electrical item, and a third mode in which the vehicle is immobilized but the contactor remains in an closed position to connect the battery to the electrical item.

16 Claims, 10 Drawing Sheets

U.S. PATENT DOCUMENTS

| | | | |
|---|---|---|---|
| 4,845,465 A | 7/1989 | Kruse |
| 4,875,041 A | 10/1989 | Dannenberg |
| 4,900,946 A | 2/1990 | Williams |
| 5,030,884 A | 7/1991 | Roussey |
| 5,053,677 A | 10/1991 | Sanner |
| 5,142,162 A | 8/1992 | Sundeen et al. |
| 5,245,251 A | 9/1993 | Irick |
| 5,365,436 A | 11/1994 | Schaller |
| 5,441,022 A | 8/1995 | Yoder |
| 5,449,956 A | 9/1995 | Williams |
| 5,563,547 A | 10/1996 | Blanchard |
| 5,585,784 A | 12/1996 | Pabla |
| 5,629,670 A | 5/1997 | Pabla |
| 5,677,671 A | 10/1997 | Pabla |
| 5,760,546 A | 6/1998 | Pabla |
| 5,780,974 A | 7/1998 | Pabla |
| 6,100,602 A | 8/2000 | Schlaudroff |
| 6,272,402 B1 | 8/2001 | Kelwaski |
| 6,285,162 B1 | 9/2001 | Koo |
| 6,297,566 B1 | 10/2001 | Lahr |
| 6,329,724 B1 | 12/2001 | Shaklik |
| 6,333,620 B1 | 12/2001 | Schmitz et al. |
| 6,362,599 B1 | 3/2002 | Turner et al. |
| 6,466,431 B1 | 10/2002 | Thomas |
| 6,515,425 B1 | 2/2003 | Bender |
| 6,518,732 B2 | 2/2003 | Palanisamy |
| 6,522,029 B1 | 2/2003 | Bell |
| 6,690,140 B2 | 2/2004 | Larson |
| 6,724,102 B1 | 4/2004 | Kelwaski |
| 6,732,026 B2 | 5/2004 | Fleming |
| 6,738,701 B2 | 5/2004 | Wilson |
| 6,762,513 B2 | 7/2004 | Landgraf et al. |
| 6,768,221 B2 | 7/2004 | Klinger |
| 6,841,895 B1 | 1/2005 | Kelwaski |
| 6,902,018 B2 | 6/2005 | Hisada et al. |
| 7,236,090 B2 | 6/2007 | Gumbel |
| 7,355,347 B1 | 4/2008 | Bell |
| 7,397,349 B2 | 7/2008 | Lahr |
| 7,421,323 B2 | 9/2008 | Dannenberg |
| 7,429,804 B2 | 9/2008 | Lengacher |
| 7,489,048 B2 | 2/2009 | King et al. |
| 7,589,471 B2 | 9/2009 | Kaczorowski |
| 7,728,457 B2 | 6/2010 | Carnevale |
| 2004/0162695 A1 * | 8/2004 | Tanaka .................. 702/127 |
| 2005/0017581 A1 | 1/2005 | Kelwaski |
| 2006/0071553 A1 | 4/2006 | Lengacher |
| 2008/0088185 A1 | 4/2008 | Bell et al. |
| 2010/0013302 A1 | 1/2010 | Howell |
| 2010/0117459 A1 | 5/2010 | Dharmadhikari |

* cited by examiner

CONTROL SYSTEM FOR A BATTERY POWERED VEHICLE

FIELD OF THE INVENTION

This invention relates to a control system for a vehicle. It also relates to a security system for a vehicle, which can, optionally be combined with the control system. In particular it relates to electric vehicles and to control and security systems that may be fitted to such vehicles. It will be appreciated that the security systems, in particular, could be fitted to other non-electric vehicles such as those that use an internal combustion engine or so called hybrid internal combustion/electric vehicles.

BACKGROUND OF THE INVENTION

As more and more consumers and businesses become mindful of the effect of vehicle emissions on the environment there has been a drive towards the development of electric powered vehicles, which use electrical power sources and electric motors as the heart of their drive train. A battery-powered vehicle will emit no harmful carbon dioxide emissions and can be charged quickly and easily by connecting it to a mains power supply.

To date a limitation of such vehicles has been the amount of energy that can be stored in the electric power source that in turn limits the range that the vehicle can travel between recharging. Advances in battery technology have meant that more energy can be stored in smaller, and hence lighter, power sources and the technology is now at the stage where a vehicle with a usable range of 50 miles or more and an acceptable top speed of, say 50 mph or so, can be produced.

There is still a need to reduce the battery unit weight to a minimum, especially for a commercial vehicle such as a delivery van, because less battery weight means that a greater payload can be carried. It is therefore important to be able to minimise wherever possible the battery drain. At present most attempts to control the battery drain during use of the vehicle have focused on improving the efficiency of the electric motor and reducing rolling resistance/drag of the vehicle. The applicants have appreciated that an effective battery power control strategy would be desirable.

A further problem appreciated by the applicant is that the security of a delivery vehicle, and to a lesser extent other vehicle types, is paramount as the driver is continually getting in and out of the vehicle. Home deliveries are increasing, in particular as a result of the growth in shopping for good on the Internet. A delivery driver may park a vehicle at a delivery address and then quickly take the goods to the address before returning. It is all too easy for the driver to forget, or choose not, to turn off the vehicle when making a delivery, which makes it vulnerable to an opportunist thief. In any event, the vehicle may be vulnerable to theft.

One well established solution to the problem of vehicle security is to fit the vehicle with an immobiliser. On a conventional petrol or diesel engined vehicle, this will isolate an electrical circuit which is needed to start the vehicle. For example, it may isolate the starter motor or, in a more sophisticated arrangement, send an instruction to the engine management unit not to provide fuel to the engine.

Whilst such immobilisers work well on petrol/diesel cars, they do not function well on electric vehicles due to the relatively long period of time it takes the battery and other electrical systems to move from a powered down state to a state in which the vehicle is ready to drive. On a petrol/diesel vehicle there is little need to power down items as battery life is not so great an issue, range not being limited by battery capacity but by the amount of fuel on board. The battery needs to be checked and the vehicle needs to perform diagnostics on the battery to ensure there is sufficient power and that the battery is safe to use. Only then can the switch means that selectively isolates the battery contacts, typically mechanical battery contactors, be closed to connect the HV electrical items to the battery. This time delay may prove irritating to a delivery driver who is repeatedly getting in and out of the vehicle if the immobiliser activates each time. Leaving things powered up all the time, on the other hand, will simply drain the battery reducing the range of the vehicle and leave it vulnerable to theft. Also, repeated opening and closing of the contactors can cause premature wear due to arcing and the like.

SUMMARY OF THE INVENTION

According to a first aspect the invention provides a control system for a battery powered vehicle of the kind which is provided with an electric power source and at least one switch means, such as a contactor, which is operable to connect the output of the power source to a high power electrical item fitted to the vehicle, such as an electric drive motor, in which the control system is operable to set the vehicle in one of at least 3 different operating modes comprising: a first mode in which the vehicle is immobilised and the contactor is held in an open position to isolate the battery from the electrical item, a second mode in which the vehicle is not immobilised and the contactor is held in a closed position to connect the battery to the electrical item, and a third mode in which the vehicle is immobilised but the contactor remains in an closed position to connect the battery to the electrical item: in which the control system is arranged to change between the modes in response to one or more signals which are indicative of the location of a driver relative to the vehicle.

The system may include a tag carried by a user of the vehicle and a detector which generates a first signal indicative of the location of the tag relative to the vehicle.

The system may switch from the first mode to the second mode in response to a first signal from a detector which detects a driver approaching, entering or unlocking the vehicle. Alternatively, it may switch from the first mode to the second mode if it receives a signal indicating that the driver has sat down in the driver seat as an alternative or in addition to indicating that the driver has approached/entered the vehicle. It may move from the first mode to the second mode only when both first and second signals have been received.

The system may switch from the second mode to the third mode in response to a third signal indicative of the driver leaving the vehicle seat. This third signal may be the same signal, or a signal from the same device as, the second signal.

The provision of the control system which provides three different operating modes allows the vehicle electrical items to be gradually switched on and switch means, such as contactors, closed as the driver enters the vehicle and starts to operate the controls, yet when the driver leaves the vehicle keeps at least the contactors closed with the high power items switched off so that the electrical system can rapidly switch back to the third mode when a driver re-enters a vehicle yet minimal power is drawn. This ensures that there is no long delay when the vehicle is to be restarted. Additionally, repeated opening and closing of the contactors can cause wear due to arcing so keeping them closed if there is a good chance the vehicle may be started again is an advantage in terms of increased life of the contactors.

It is envisaged that the switch means will typically comprise a contactor as these devices are well suited to switching high power loads. The electric motor of a battery powered vehicle will typically draw a lot of power so a robust switch is needed. Other switches, perhaps solid state devices, could be used.

In the third mode the control system may switch off one or more electrical items which are switched on in the second mode, preferably items which use relatively large amounts of power. Examples are electric power assisted steering pumps, heater systems etc. This switch off is performed independent of the position of the contactors which remain closed.

In a most preferred arrangement there may be at least 4 different operating modes such as to additionally include: a fourth (standby) mode which the control system enters from either the first mode or the third mode prior to entering the second mode, and in which fourth mode the vehicle immobiliser routine is performed and driver identity checked.

The control system may fall through from the fourth mode to the second mode after the immobilisation and authorisation process is complete. Alternatively, a signal such as the turn of an ignition switch or press of a starter button may be required. If a fault is detected or the immobilisation routine fails the system may switch the vehicle back to the first mode.

In the first mode all non-essential electrical items may be switched off. By non-essential electrical items we mean lights, indicators, door lock modules, control systems etc which do not have a safety function. An example of an item with a safety function is the vehicle hazard lights if provided.

The control system may include a first timer which counts the time since the control mode moved from the fourth mode to the second mode, the control system moving the vehicle to the first mode after a predefined period of time has been counted by the timer. This time may comprise 1 minute, or perhaps longer, say 5 minutes.

It may also include a second timer which counts the time from the entry into the fourth mode (where provided) and moves back to the first mode if the vehicle has remained in the fourth mode for longer than a predefined length of time, such as 1 minute. This would typically indicate a fault or a failure of the immobilisation routine.

The system may include at least one door sensor which is associated with a door of the vehicle, the sensor being responsive to a security device carried by the driver. This sensor may comprise a tag detector and a tag carried by the driver as already mentioned. This sensor may be used as the means for detecting the driver entering the vehicle and may form the basis of the first signal used to move from the first mode to the second mode. This may comprise an inductive loop based detector for detecting the presence of electromagnetic radiation emitted by a tag detector to generate a signature signal or ID.

This sensor/detector may comprise a detector for an 1-button$^{Im}$ type tag that is carried by the driver. Such devices are manufactured by Dallas Semiconductor inc and are well known in the art.

The security device (such as an I-button) may be matched to the vehicle by a unique identifying code (or a pseudo-unique code). Thus only a sensor that is matched to the vehicle will operate the door sensor.

The security device may emit a first signal which is detected by the control system, and in response to the signal the control system may commence an immobilisation routine and a driver authorisation check.

Thus, as a driver approaches the vehicle in its locked state they may present the security device. If it is recognised by the door sensor (it has a recognised code) the door sensor will send a wake up signal to the control system. This will perform a check and will then start to get the vehicle ready to drive, powering up some systems and moving into the fourth mode.

A second sensor may also be provided which detects the presence of the driver in the vehicle seat and generates the second output signal. The second output signal from this sensor may therefore also be passed to the control system.

In applications where an opening/closing door is not fitted, or additional security is desired, a sensor similar to the first may be provided near or next to the drivers seat and the two signals in combination used to provide the means of detecting the driver entering the vehicle with the seat sensor alone being used to provide confirmation that a driver has left the vehicle.

The seat sensor may wait for a predefined time before providing its output signal, or the control system may wait for a time since the signal is detected before moving the vehicle to the second mode. This time may comprise 5 seconds, or 10 seconds or more. It should be as short as possible to maximise security but long enough to ensure the mode is not changed accidentally due to the driver moving around on the seat when driving.

When in the first and third modes, the vehicle control system may immobilise the vehicle. This may be performed by disabling one or more electrical items fitted to the vehicle which are essential to move the vehicle. For example the drive motor may be disabled or gearbox (if fitted) held in neutral.

The vehicle control system may also be operable to place the vehicle in a fifth mode in which all electrical items are powered down. In this mode, for example, maintenance of the electrical system or removal of the battery can be performed without risk of electric shock.

An ignition switch or button may be provided which produces a third signal which must be received by the control system to move the vehicle from the first (or fourth) mode to the second mode. Alternatively, the vehicle may move to the second mode as soon as the driver presses the accelerator or changes gear or release the handbrake. It will remain in this mode until the driver leaves the drivers seat.

In a refinement, the control system may operate the vehicle in the second mode according to more than one sub-mode depending on the identity of the driver operating the vehicle. The driver identity can be determined by one or more signals passed to the control system from devices fitted to the vehicle.

The door sensor may determine which one of at least two different security devices (mechanical or electrical keys) was used to access the vehicle and send a different signal to the control system in each case.

Alternatively, a coded key pad may be provided through which the driver can enter a code or password. Also, for a suitably equipped vehicle, the RFID or ibutton tag (or other device) could provide a reprogrammable means of conveying a code or password identifying a driver.

For example, in one sub-mode the vehicle maximum speed may be set at its highest available level, and the torque available to the motor may be also set at its highest available level. In a second sub-mode the maximum available speed may be limited as well as the torque. In a third sub-mode the speed and torque may be limited still further. This allows different drivers with different experience levels to operate the vehicle safely, or allows operation of the vehicle in different conditions to be controlled. For example, one key may be issued which allows access to the first sub-mode if the vehicle journey covers fast roads such as motorways, with a second key being issued giving access to the third mode only if the vehicle is to be used in a built up urban area such as a city centre.

According to a second aspect the invention provides a security system for a vehicle of the kind having a drive train comprising a battery, at least one contactor, an electric motor connected through the contactor to the battery and a drive circuit which controls the function of the electrical motor, and an access control circuit which is arranged to identify a driver approaching or entering the vehicle and which also controls the distribution of electrical power to one or more further electrical items fitted to the vehicle, the security system comprising: a first sub-system which is incorporated within the drive train or the access control circuit and a second sub-system which is incorporated within the other of the access control circuit and the drive train, the two sub-systems being connected across a communications link, and in which prior to driving the vehicle the two sub-systems perform a security test comprising the following sequence of steps: the second sub-system sends a first coded signal to the first sub-system; the first sub-system checks for a match between the first coded signal and a code stored in a memory associated with the first sub-system; first sub-system sends a second coded signal to second sub-system; the second sub-system checks for a match between the first coded signal and a code stored in a memory associated with the second sub-system, and in the event that both the first and second coded signals do not match the vehicle is immobilised.

The security system therefore provides for a two-way handshake between the control sub-system and the drive train. If the handshake fails in either direction of both directions the vehicle will be immobilised.

The electrical item may comprise the electric motor of the electric vehicle.

Both the first sub-system and the second sub-system may be provided with a pair of code generators, each one of the pair being synchronised to the other one of the pair of the other sub-system, and with an area of nonvolatile memory in which the transmit code and receive codes are stored.

The code generators may generate a pseudo-random code and may generate an initial code when seeded with a seed value. Thus, provided both generators are seeded at the same time with the same seeds (on initial commissioning of the vehicle for example) the rolling codes will remain in sync.

At each stage, where a match is performed, a reply may be sent back to the sub-unit that sent the coded signal to indicate whether or not the match was successful. If it was not, a further coded signal may be sent and the match routine retried. This may be repeated again if desired. In a most preferred arrangement it may have three tries. This allows for slight mismatch between the two generators to be accommodated, for example if they drift slightly out of sync.

The system of the second aspect of the invention may be integrated with the control system of the first aspect, in which it possible that the request may be a request to move from first mode to second mode when a driver enters a vehicle, or perhaps from the second mode to the third mode as the driver sits down in the drivers seat.

By providing a control system according to the second aspect the security of the vehicle against theft due to tampering with either the drive train or access control circuit is improved. Only if a drive train and access control unit which are correctly coded to one another is present will the vehicle immobiliser be deactivated. If a sub-unit that is taken from a different vehicle is used, for example one that is stolen from a different vehicle, it will not talk to the other sub unit and the vehicle can not be started.

The access control sub-system may comprise an integral part of the vehicle control system within the meaning of the first aspect of the invention.

According to a third aspect the invention provides an access control system for a vehicle which comprises a control unit responsive to signals from at least one door module, in which the door module is connected to the control unit by a communications link and is provided with an electronic code that can be transmitted across the communications link which is unique to that door module on the vehicle; different codes being defined by connecting a corresponding different combinations of pins on the door module to a part of the vehicle or a component fitted to the vehicle which is held at a predefined electrical potential.

The predefined potential is preferably the vehicle earth, and the part or component may comprise part of the vehicle chassis or bodywork. Pins not connected to this potential may be left floating or connected to a different potential, such as 12 volts.

This arrangement of coding a door module provides a simple and cost effective way of identifying different door modules on a vehicle. There is no need to provide different door modules which have codes written into their memory during manufacture-they can be coded during assembly by correct connection of the pins.

The pins may, for example, be grounded by connecting them to the body or chassis of the vehicle or any other earthed item. They may be connected directly or through earth leads/straps.

The door module may include a microprocessor, each pin being connected to a respective input of the microprocessor. The microprocessor may produce the unique code and may transmit it across the communication link.

Where more than one door module is provided, each may be given a different code.

The code may interrogated by the door module reading the status of the pins and transmitting a signal across the communication link to the control system. Alternatively, the control system may passively read the code across the communications link.

The communications link may comprise one or more hard-wired electrical connections. These may form part of a multiplexed network bus.

The door module may include a sensor such as a reader for an I-button which reads an ID from a compatible tag and may be arranged to transmit the ID from the sensor to the control system as a message. The door modules code may also be included in this message, either before or after the ID. The activation of the sensor may trigger the sending of the code to the control system by the door module.

Alternatively, when the sensor reads an ID from a security device such as an I-button it may send that information to the control system. In return the control system may send a signal back to the door module asking for its code, e.g. asking which door module sent the signal. On receiving the code from the door module, the control system may perform a check to determine if the lock is a lock associated with the vehicle. A list of codes may be stored in the memory of the control system to enable this check to be made. Only if the lock is recognised will the information from the lock be processed.

As with the second aspect, the system of the third aspect of the invention may be combined with any feature of the first and second aspects of the invention.

LIST OF FIGURES

There will now be described, by way of example only, one embodiment of the present invention with reference to and as illustrated in the accompanying drawings of which.

DETAILED DESCRIPTION OF AN EMBODIMENT

Figure 1:
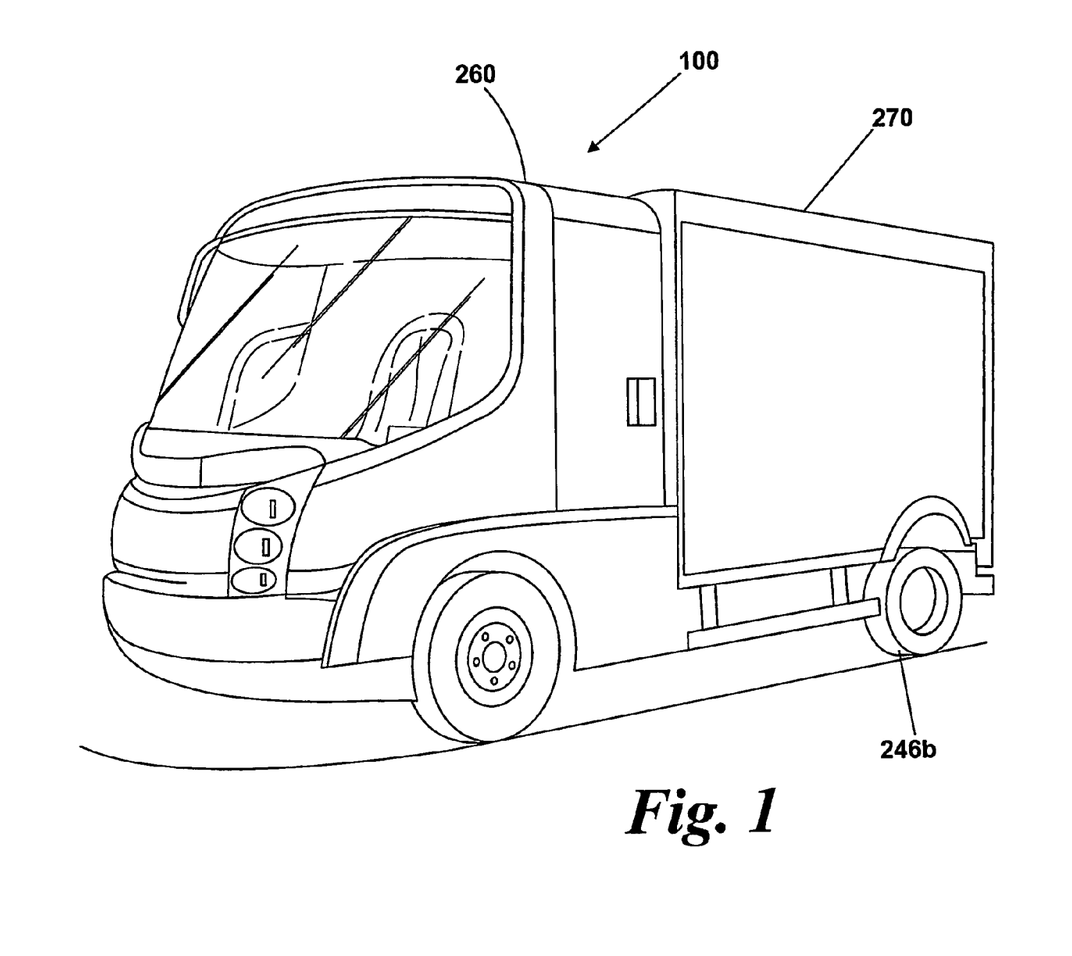
FIG. 1 is a general illustration of an electric vehicle to which the invention relates.
Figure 2:
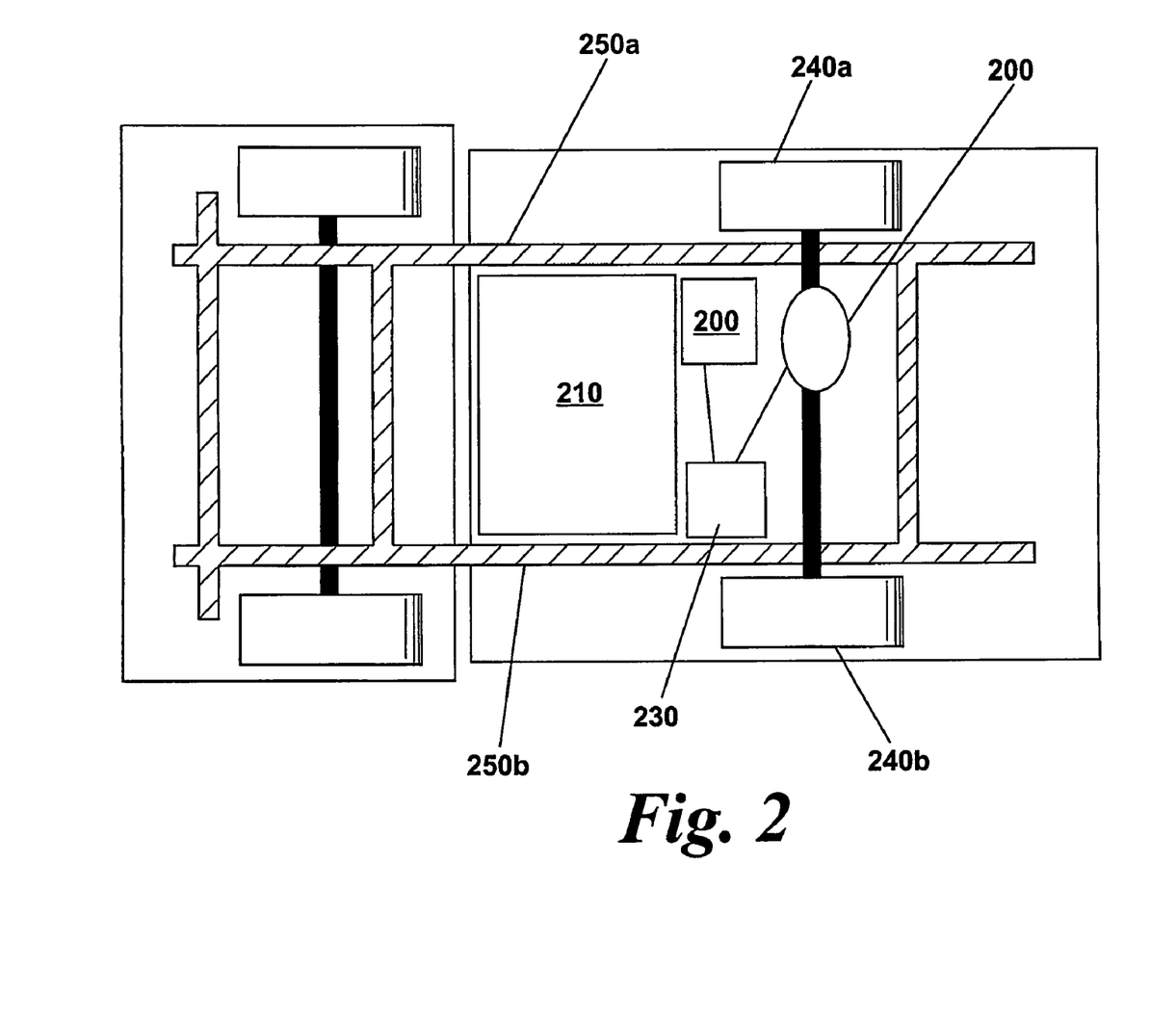
FIG. 2 is a simplified view from the underside of the vehicle of FIG. 1.

FIG. 1 shows an electric vehicle 100. The vehicle in this example is a specialist delivery vehicle, but through a simple change to the vehicle body it could be a box van or minibus or any other commercial or domestic use vehicle. At its heart is an electric drive train including an electric motor 200 which is supplied with power from a battery assembly 210. This is shown in FIG. 2 of the drawings which shows schematically the vehicle viewed from below. The motor drives a rear axle 229 of the vehicle 100 through a gearbox 230. The rear axle connects to two rear wheels of the vehicle 240a, 240b.

The battery assembly 210 comprises a self contained unit that comprises battery cells, battery control circuitry for regulating the battery charge and voltage, and a set of contactors which selectively connect the batteries to the units output terminals or isolate them. The contactors typically comprise relays and as such consume power to hold the contacts closed. The battery in this example has a nominal output of 42 volts or 120 volts and sits between the main side chassis rails 250a, 250b of the vehicle. A secondary output, held at a constant 12 volts at all times, is also provided. The output of the battery unit 210 is controlled by a drive train controller (not visible in FIG. 2). The drive train controller operates the motor 200 to move the vehicle according to the drivers demand. It also controls selection of the gears in the gearbox 230 in response to either driver demand (manual) or in accordance with the operating conditions (automatic). The drive train controller also controls a cooling system which prevents the motor from overheating and keeps the cabin at a comfortable ambient temperature. It also controls the operation of switches which selectively isolate the HV components from the battery output terminals. The controller and the battery and isolators are all built in to one self contained power pack.

At the front, the chassis carries a cab 260 in which the driver sits and which is protected by a lockable door. As shown the cab has a driver and passenger seat (not shown) as well as the usual manual controls including a steering wheel and foot operated brakes and accelerator, a gearlever and a handbrake. Dials and buttons/switches for manual operation of electrical items such as lights and indicators are also provided as usual for a roadworthy vehicle. At the rear the chassis carries a body 270 such as a closed van body as shown in FIG. 1 (although other bodies can be provided).

A smart junction box 300 (shown in the schematic of FIG. 3) is located within the cab 260 where it is protected from the elements and this is connected by a CAN bus 310 to the drive train (in particular to the battery drive train controller) and also through a simpler LIN bus 320 to other low voltage electrical items fitted to the vehicle such as lights, side lights, indicators etc. The SJB 300 also connects to the battery controller and also a vehicle security system. The SJB takes a permanent 12 volt feed from the battery unit and controls how this is fed across the bus to the electrical items.

Figure 3:
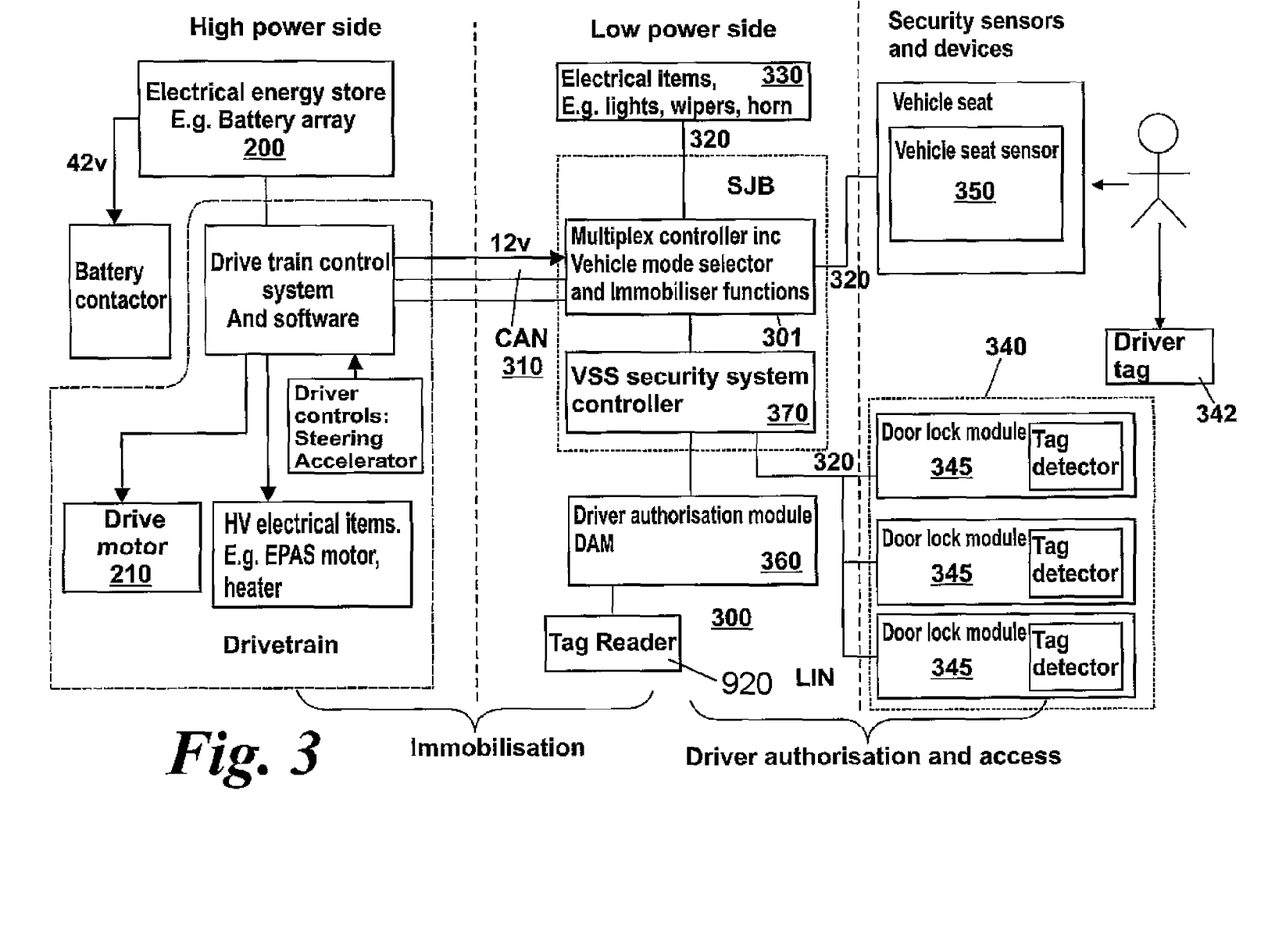
FIG. 3 is a schematic of the electrical and electronic circuitry of the vehicle.
Figure 4:
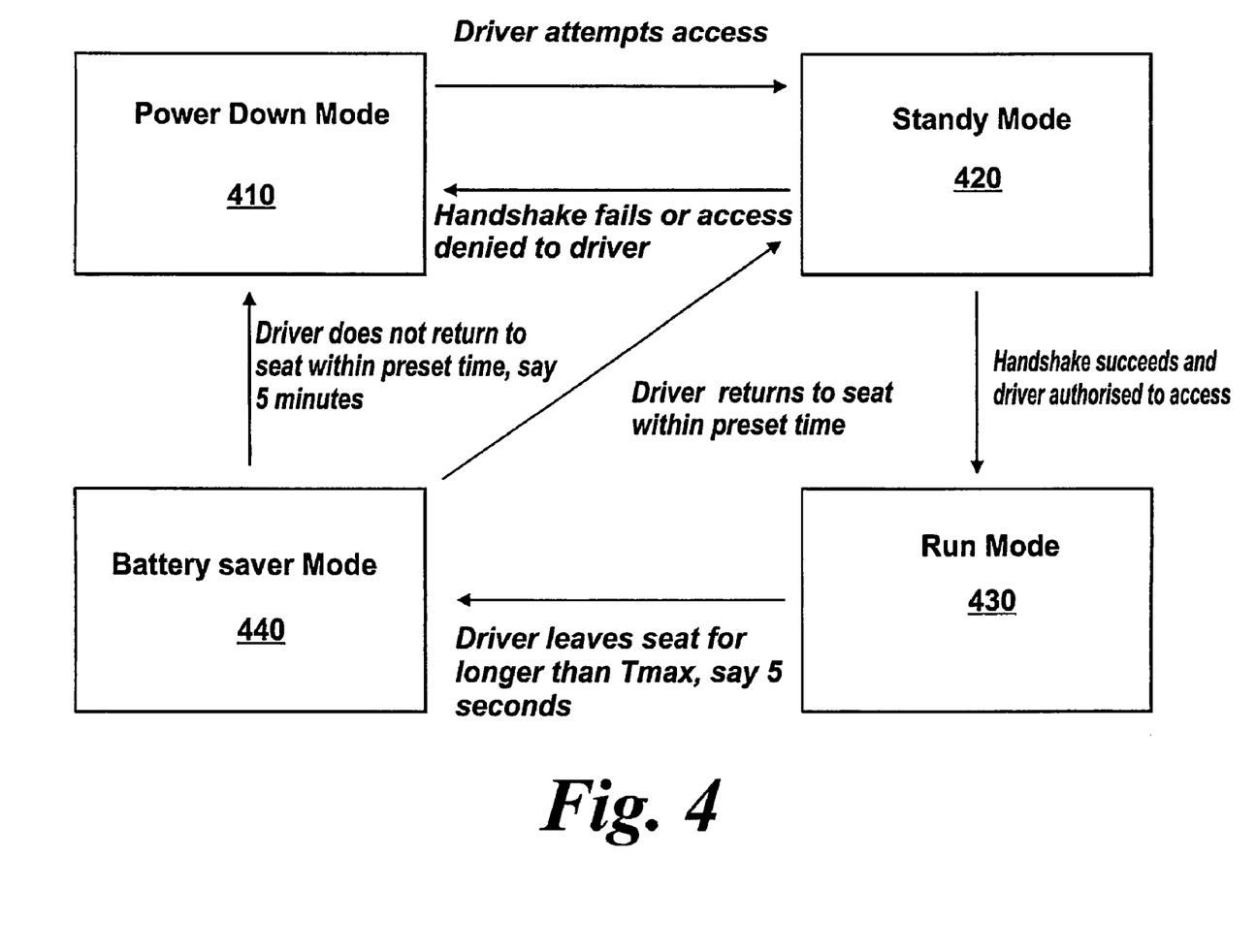
FIG. 4 is a state diagram showing the relationship between the four key operating modes of the vehicle of FIG. 1.

The electrical arrangement of the High power system and the low power systems including the SJB 300 is shown in detail schematically in FIG. 3 of the accompanying drawings.

The smart junction box (SJB) 300 is in concept a central controller which interfaces for digital (ON/OFF) signals, analogue signals, signal and power level devices and communications devices. It sets the information that it is to be shown on the drivers instrument panel, sets the voltage and current that is supplied to the vehicles electrical items so as to turn On/Off lamps etc. Along with other associated circuitry it also performs the security functions of checking driver authentication and immobilisation of the vehicle.

At its heart, the SJB 300 comprises a microprocessor based multiplex control circuit 301 which selectively controls the power distribution around the vehicle to the electrical items 330, by opening and closing switches—either hardware switches or software switches, or issuing control signals which cause the battery controller to open and close switches, and which also controls the power modes that the vehicle enters. To this end it includes program instructions in an area of memory which can be executed by the processor.

The SJB 300 can set the vehicle in any one of 4 operating modes at any given time. Each mode differs according to whether the contractors are open or closed, which switches are open or closed, whether or not driver authorisation has been completed and whether or not the immobilisation routine has been passed. The four modes are as follows:

1a) MCU OFF
1) POWER DOWN
2) RUN
3) BATTERY SAVER; and 4) STANDBY

These modes, and their inter-relation, are shown in the state diagrams of FIG. 4 to FIG. 7 the accompanying drawings. Each mode will now be described in more detail.

1a) MCU OFF

In this mode the battery control unit turns off all the electrical items other than to provide residual power at 12 volts to the SJB (and any devices which take residual power from the SJB). The battery contactors are open. This mode preserves the battery power. In this mode the vehicle cannot be driven and operation of the accelerator does not cause the motor to turn.

1) Power Down

In this mode 410, all high power electrical items are powered off as well as most low power items. The contactor are open. However, key safety items such as sidelights, hazard lights are powered up and can be operated by the driver. This enables the power drain on the battery to be minimised whilst ensuring the vehicle complies with road safety requirements. In this mode the battery is asleep and is only checking its health with no real connection to the vehicle drive train because the contactors are open. No high power output is made available for instance. The vehicle is immobilised. In this mode the vehicle cannot be driven and operation of the accelerator does not cause the motor to turn.

2) Run

This mode 430 is the main mode in which the vehicle can be driven, and in this mode the contactors are closed and all the electrical devices are powered up as required. In this mode the immobiliser is deactivated. To remain in this mode the driver must be seated in the drivers seat.

3) Battery Saver

As there can be a considerable time delay awakening the battery from the power down mode 410 it is useful to enter this mode 420 as soon as it is apparent that the driver is no longer driving, for example having left the drivers seat. In this mode many of the electrical devices will be powered down to reduce power consumption, the vehicle will be immobilised yet the contactors will remain closed and the battery on alert.

4) Standby

This mode 420 is entered prior to entering the run mode and performs the immobilisation routines as well as other security checks.

Note that reference to an item being powered up does not mean it has to be switched on. For example, a sidelight being powered up simply means it has power fed to it and can be switched on or off by the driver operating a light switch or button. When powered down it is always off regardless of what the driver wants it to do.

The switch between one mode and another is performed by the SJB 300 in response to signals received from various devices such as sensors, switches and other circuits fitted to the vehicle. The key devices are a driver proximity/access detector system 340 comprising a number of door lock modules 345 which determines when a driver is in the proximity of the vehicle and a seat sensor 350 which detects when the driver is sitting in the drivers seat A state diagram showing possible changes in mode is provided in FIG. 4 of the accompanying drawings.

Figure 5:
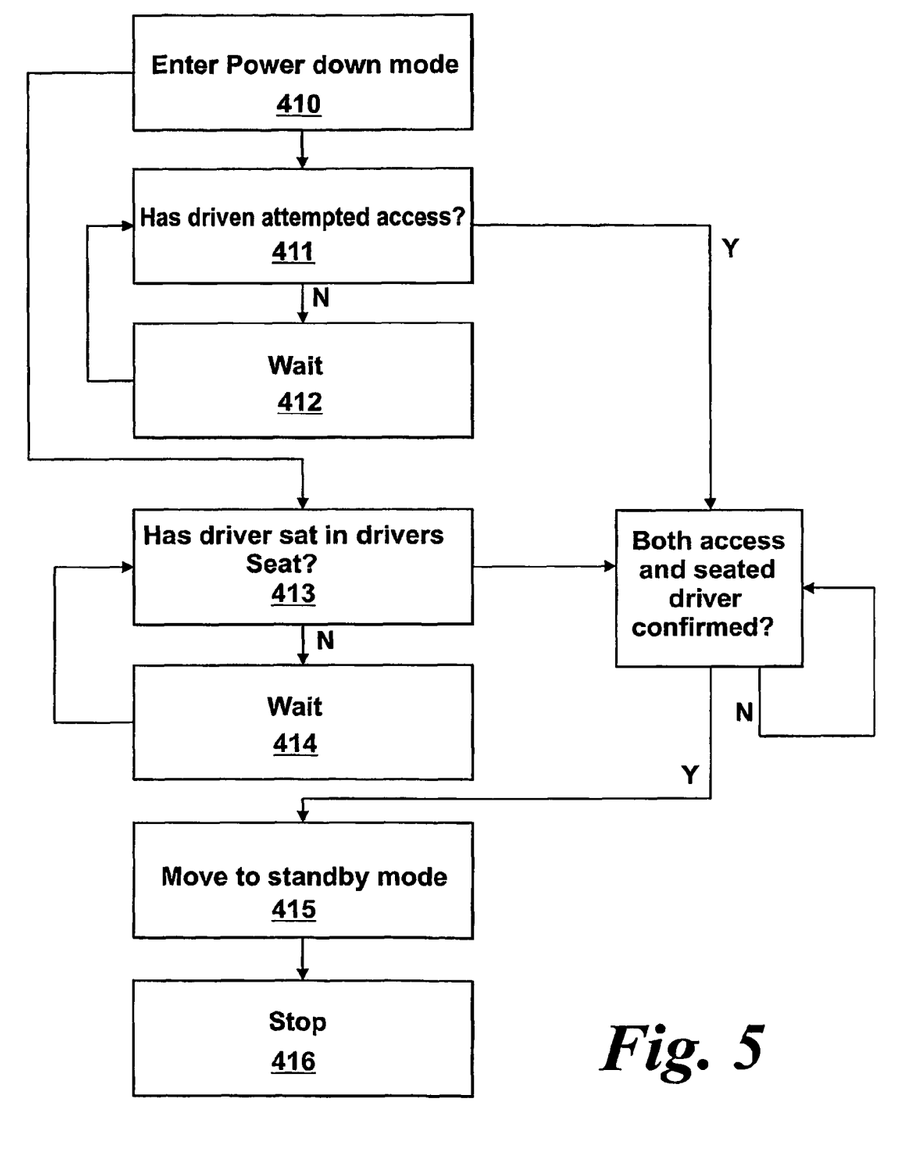
FIG. 5 is a first flow chart showing the operational steps carried out in a power down mode of the vehicle.

Initially, as shown in FIG. 5, the vehicle 100 is placed in the power down mode 410, and the SJB waits to see if an attempt to access the vehicle is made (step 411, 412). If it has a check (step 413) is made to see if the driver has sat in the drivers seat. If not the SJB will wait 414 for a period of time. On receipt of a valid signal indicating that the driver is in the driver seat the vehicle is moved 415 to the standby mode and the power down mode ends 416.

Figure 6:
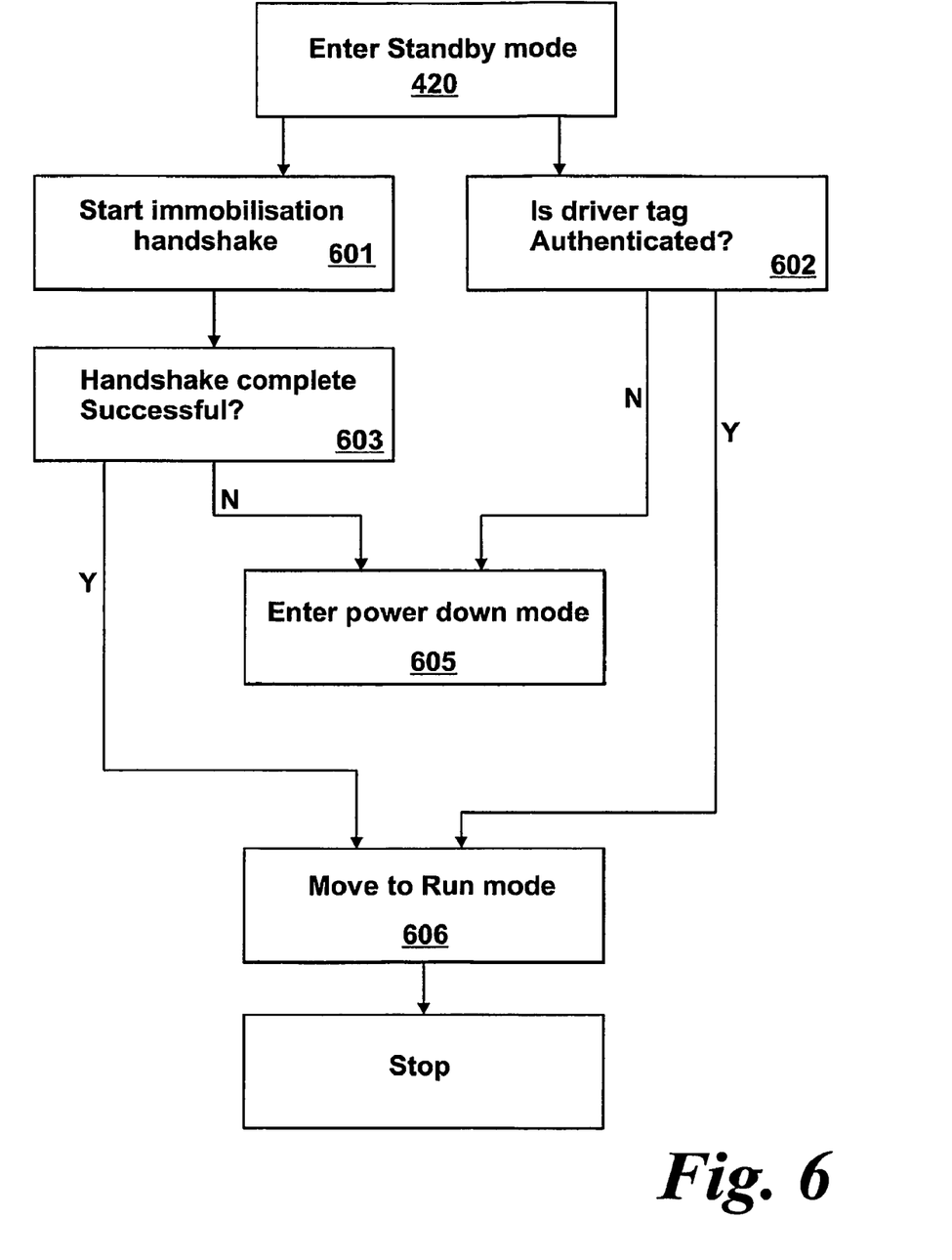
FIG. 6 is a second flow chart showing the operational steps carried out in a standby mode of the vehicle

As shown in FIG. 6, in the standby mode the immobilisation is started (step 601) and at the same time an attempt to authenticate the drivers access tag is made (step 602). The SJB checks to see if the handshake has completed successfully (step 603) and if so, and the tag is authenticated the vehicle drops into the run mode (step 606). If the handshake fails or authentication is not made the SJB drops the vehicle back to the power down mode (step 605) otherwise it enters the run mode (step 606) and the standby mode ends.

Figure 7:
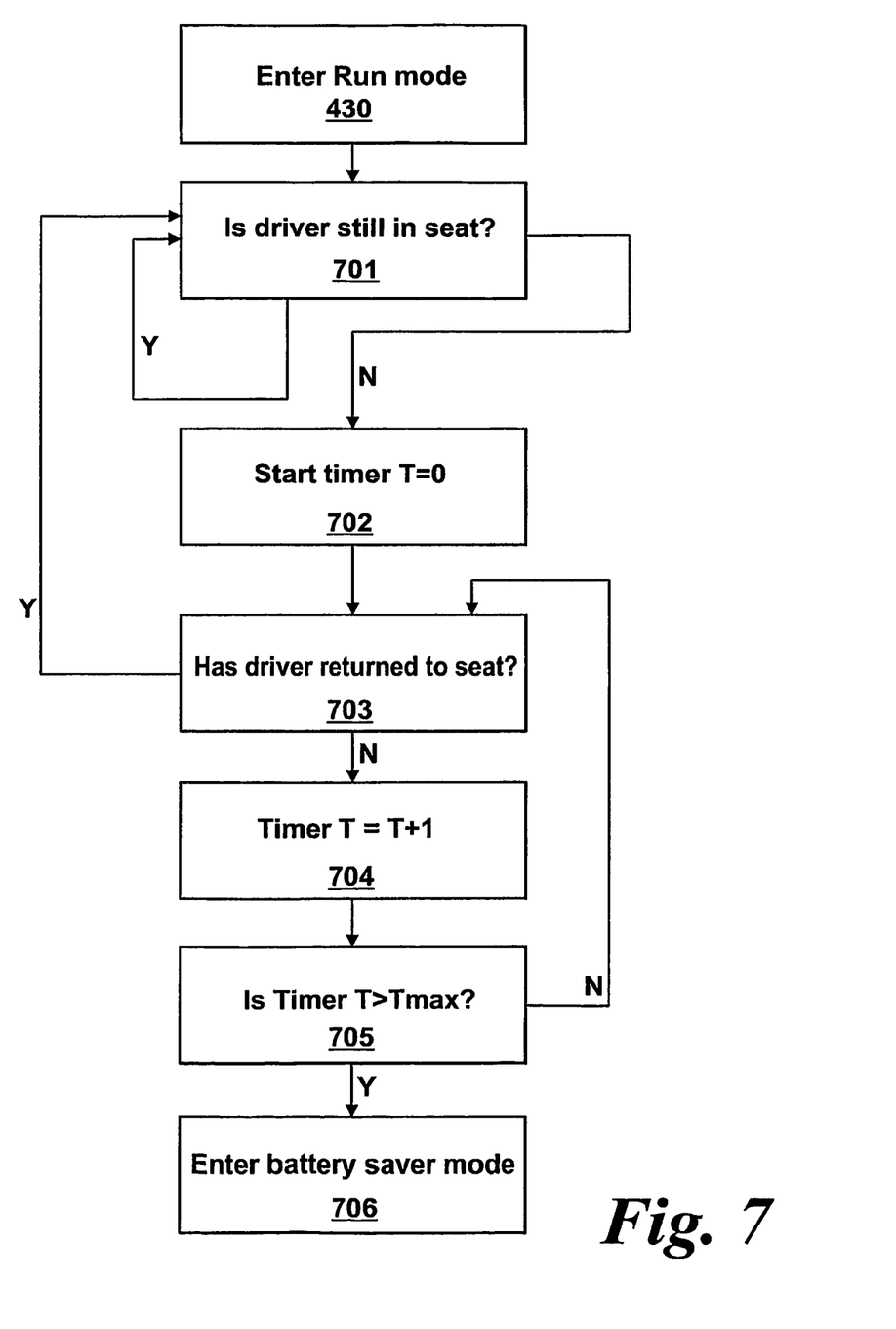
FIG. 7 is a third flow chart showing the operational steps carried out in a run mode of the vehicle

In the run mode the vehicle is ready to be driven. As shown in FIG. 7, in this mode the SJB 300 checks that the driver is still in the drivers seat (step 701). Next, if it is determined that the driver leaves the seat a timer is started (step 702) and a check is made again at regular intervals of time t see if the driver has returned to the seat (step 703). If the driver has not returned by the time the timer reaches (step 704, 705) a predefined value Tmax (say 5 seconds) then the SJB moves the vehicle back to the battery saver mode (step 706) ready to quickly return to the standby mode if they sit back in the seat. If the driver returns to the seat before Tmax then the SJB returns to checking for seat occupancy and the timer is stopped/reset to its start value.

Figure 8:
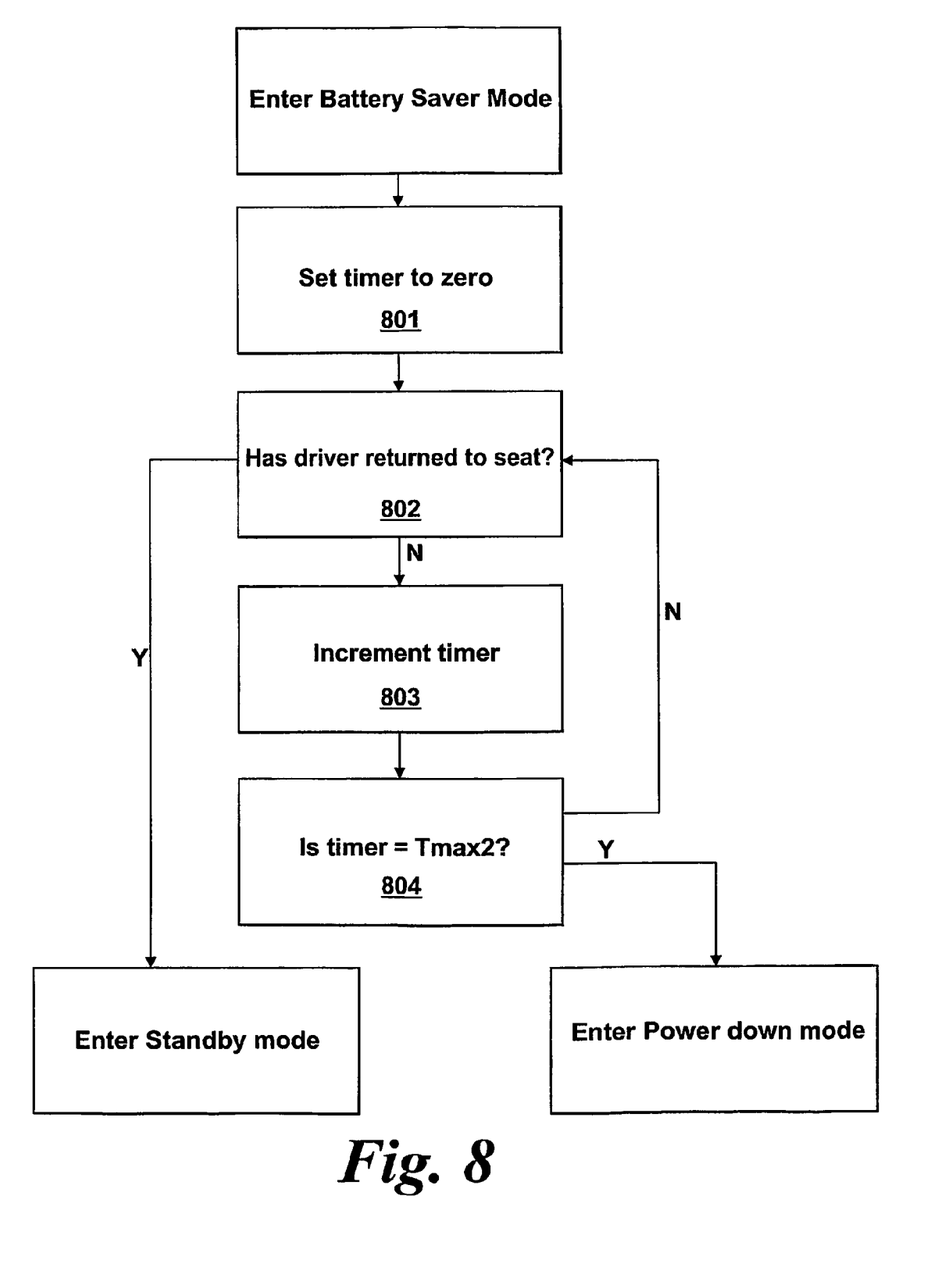
FIG. 8 is a fourth flow chart showing the operational steps carried out in a battery saver mode of the vehicle.

In the battery saver mode, a second timer/counter is started (step 801) from an initial zero value as soon as the mode is entered. The system checks to see if the driver has returned to the seat (step 802) and if so the vehicle is moved to the standby mode ready to go back to run mode. If not, the timer is incremented (step 803) and checked (step 804) to see if it has a reached a predefined limit (Tmax2). If not, the check/increment continues. If the limit has been reached it is assumed the driver is not going to return soon and the vehicle is put back in the power down mode.

The signals from the various sensors, used to move between steps within the different modes, are processed within the SJB by an integrated vehicle security system (VSS) 370.

Figure 9:
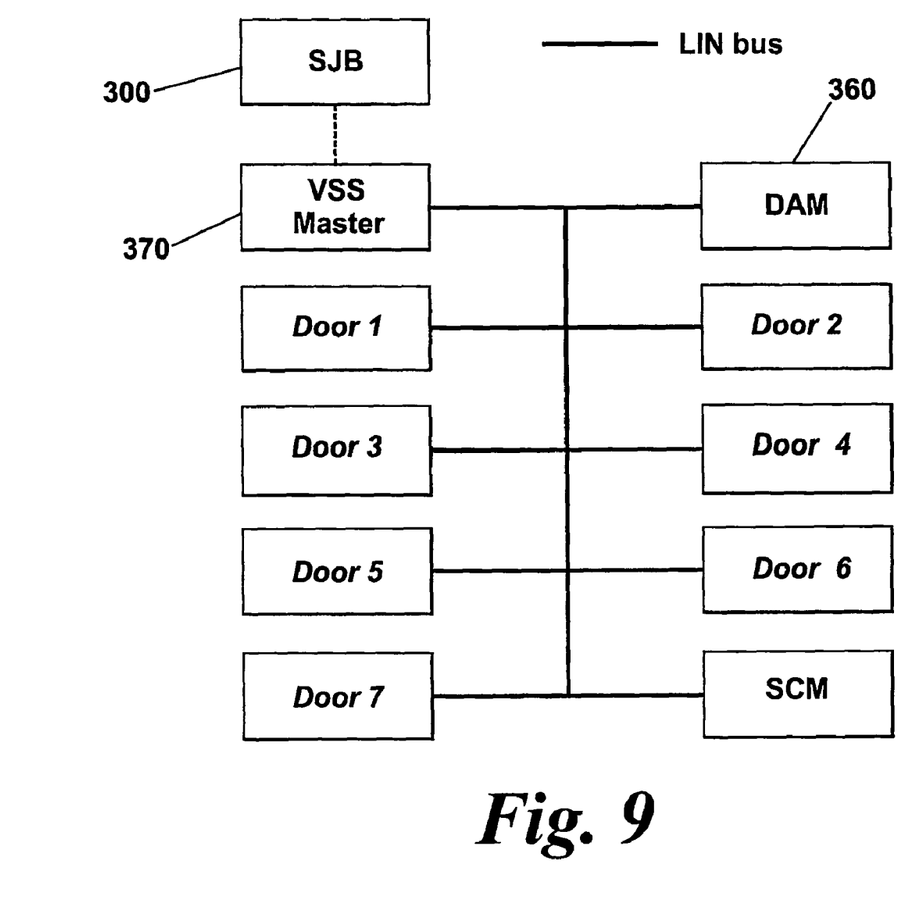
FIG. 9 is a schematic showing the various functional parts of a vehicle security system incorporated into the vehicle of FIG. 1.

The vehicle security system 370 comprises three main parts: a functional centre which supplies signals to the security devices including tag reader 920, seat sensors 350 fitted to the vehicle, a driver authorisation module 360 which identifies a driver from signals received from the devices, and an arrangement of one or more door lock modules 345. It will also receive a signal from the drivers seat sensor 350, although this can be fed direct to the processor of the SJB 300 if preferred.

The vehicle security system is shown schematically in more detail in FIG. 9 of the accompanying drawings. The key components are:

the master VSS LIN node 370 which is present in the SJB and through which the VSS talks to the SJB; and a plurality of slave nodes including: at least one DAM 360 which receives a signal from a first sensor (seat) 350 and a security device reader, and a number of second sensors (door lock module 345 labelled simply as Door 1, Door 2 . . . Door 7 in FIG. 8) responsive to a user data carrier (UDC) or tag 342 such as an Ibutton reader.

Access Control

A function of the security system 370 is to interrogate the door lock modules 345 whenever a driver attempts to gain access and if the driver tag 342 is recognised instruct the door lock module 345 to open its associated door lock. This enables the correct door lock associated with a module to be opened or closed. As already mentioned it is this prompt that is used to trigger movement of the vehicle from the Power down mode to the battery saver mode.

Figure 10:
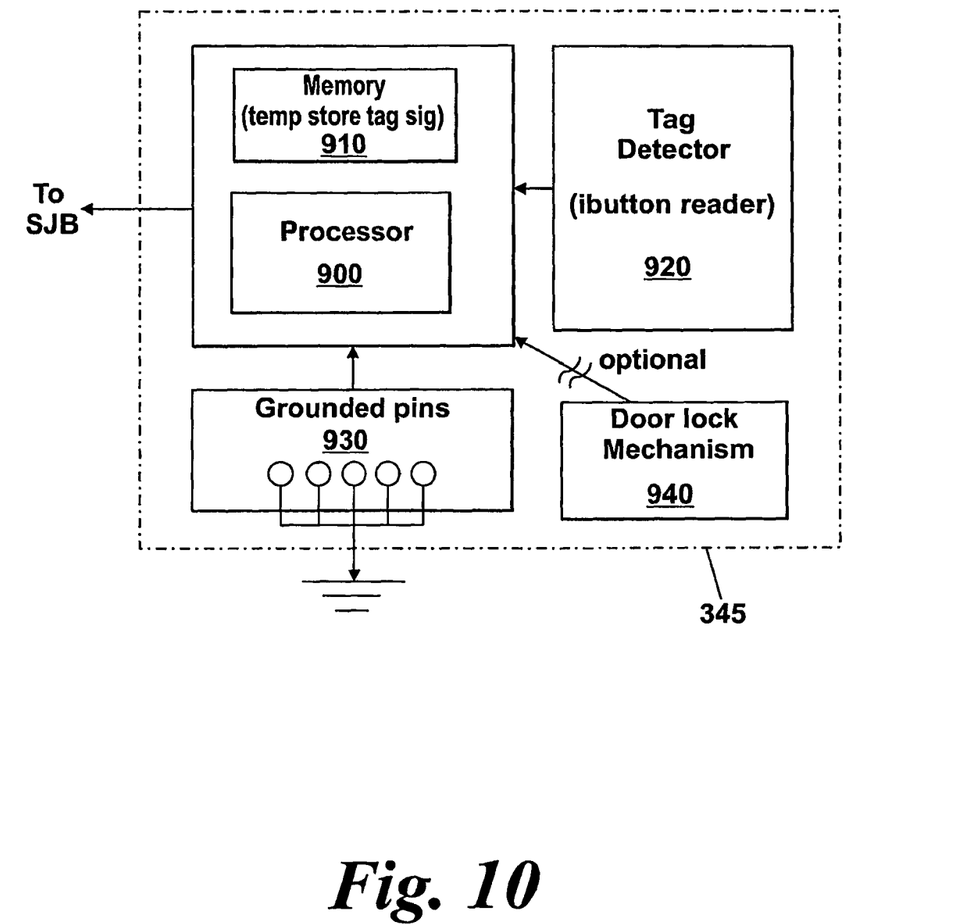
FIG. 10 is a schematic representation of a door lock module of the vehicle.

A door module 345 is shown in FIG. 10 of the accompanying drawings. It comprises a main processor 900, an area of electronic memory 910 into which a signature or ID from a tag can be stored, a tag detector/reader 920, and a plurality of conductive pins 930. The pins can be earthed out, and the choice of pins that are earthed sets a unique code for the door module. This allows a set of door modules fitted to a vehicle to be coded in a simple and quick manner during fitting.

In use a driver may present their tag 342 to the tag reader 920. This will detect the presence of the tag and will awaken the door module ready to read the tag signature. The tag reader will then read the tag signature and also read its unique code (set by the earthed pins 930) and send a message back to the SJB 300. This will tell the SJB where the door module is on the vehicle and which tag it has read. The SJB 300 will then compare the signature with a set of prestored acceptable signatures it holds in memory. If the signature matches a stored signature, it will send a signal back to the door module to say that the driver is authorised. The door module can then, optionally, unlock a door lock mechanism 940 associated with that module to allow the driver to access the vehicle through the door. This function could alternatively be performed by the SJB.

Immobilisation

Another function of the SJB 300 is to perform vehicle immobilisation. The immobilisation serves to ensure that the vehicle 100 cannot be driven unless a correct driver security device 342 is presented (e.g. an 1button) and also the correct match of SJB 300 to drivetrain is present. This ensures that the units cannot be tampered with.

The immobilisation comprises a two stage handshake process that is performed between the SJB 300 and the drivetrain controller.

To perform the handshake both the SJB and drivetrain include two random number generators and a memory in which are stored the two most recent random numbers. Two pairs of random number generators are formed, with one of each pair being from the SJB and the other the drivetrain, and both random number generators of a pair are seeded with the same seed so they are synchronised. Each time a handshake routine is run, the generators are stepped onto the next number in their sequence.

In a first step, one random number generator of a pair (in this example one of the generators of the SJB) will send its most recent number to the drive train controller which will compare it with its most recent number stored in memory. If the initial numbers match, a signal is sent back to the SJB to say that a match has been made, along with the next number in the RNG sequence. The SJB checks that this next number is correct for the sequence, and if not causes the vehicle to become immobilised. If the next number is correct the SJB sends a confirmation to the Drivetrain to allow the re-mobilisation process to continue. If the initial numbers do not match, a fail signal is sent back. The SJB will then send the next number it generates, and the drive train controller will attempt a match to its most recent number (no new number being generated), this "retry" process is only allowed to occur twice, so allowing a total of 3 attempts at achieving a match. If no match is made, a further attempt is made after which a lack of match will cause an immobisation fault signal to be sent back to the SJB.

If a match was achieved, the same process is repeated in reverse from drive train controller to SJB using the second pair of random number generators. Again, three attempts are allowed.

If a match is achieved in both directions, then the immobilisation will be released and the system readied to enter the drive mode. If not, the system will be locked down and will remain immobilised.

The invention claimed is:

1. A control system for a battery powered vehicle which is provided with an electric power source and at least one contactor which is operable to connect the output of the electric power source to an electric drive motor, in which the control system is operable to set the vehicle in one of at least three different operating modes comprising: a first mode in which the vehicle is immobilised and the contactor is held in an open position to isolate the electric power source from the electric drive motor, a second mode in which the vehicle is not immobilised and the contactor is held in a closed position to connect the electric power source to the electric drive motor, and a third mode in which the vehicle is immobilised by opening at least a first electrical circuit related to operation of the vehicle but the contactor remains in an closed position to connect the electric power source to the electric drive motor; in which the control system is arranged to change between the modes in response to one or more signals which are indicative of the location of a driver relative to the vehicle.

2. A system according to claim 1 which includes a tag carried by a user of the vehicle and a detector which generates a first signal indicative of the location of the tag relative to the vehicle.

3. A system according to claim 1 which is configured to switch from the first mode to the second mode in response to a first signal from a detector which detects a driver approaching, entering or unlocking the vehicle.

4. A system according to claim 1 which is configured to switch from the first mode to the second mode if it receives a second signal indicating that the driver has sat down in a driver seat of the vehicle.

5. A system according to claim 3 which is configured to switch from the first mode to the second mode only when both the first signal and a second signal indicating that the driver has sat down in a driver seat of the vehicle have been received.

6. A system according to claim 1 which is configured to switch from the second mode to the third mode in response to a third signal indicative of the driver leaving a seat of the vehicle.

7. A system according to claim 1 in which the electrical circuits related to vehicle operation comprise one or more of power assisted steering pumps and heating cooling systems.

8. A system according to claim 1 in which the control system is further operable to get the vehicles in a fourth mode which the control system enters from either the first mode of the third mode prior to entering the second mode, and in which in the fourth mode a vehicle immobiliser routine is performed and a driver identity checked.

9. A system according to claim 8 which is arranged to move from the fourth mode to the second mode after the immobilisation and authorisation process is complete.

10. A system according to claim 8 in which the control system includes a first timer which counts the time since the control mode moved from the fourth mode to the second mode, the control system moving the vehicle to the first mode after a predefined period of time has been counted by the timer.

11. A system according to claim 8 in which in the first mode all non-essential electrical items are switched off.

12. A system according to claim 11 in which the control system includes a second timer which counts the time from the entry into the fourth mode and moves back to the first mode if the vehicle has remained in the fourth mode for longer than a predefined length of time.

13. A system according to claim 8 which includes at least one door sensor which is associated with a door of the vehicle, the sensor being responsive to a security device carried by the driver.

14. A control system according to claim 8 in which in the first and third modes the vehicle control system immobolises the vehicle.

15. A control system according to claim 8 which is operable to the place the vehicle in a fifth mode in which all electrical items are powered down for maintenance of the electrical system or removal of the electric power source.

16. A control system according to claim 8 which is operable to operate the vehicle in the second mode according to more than one sub-mode depending on the identity of the driver operating the vehicle.

* * * * *